Patented May 13, 1952

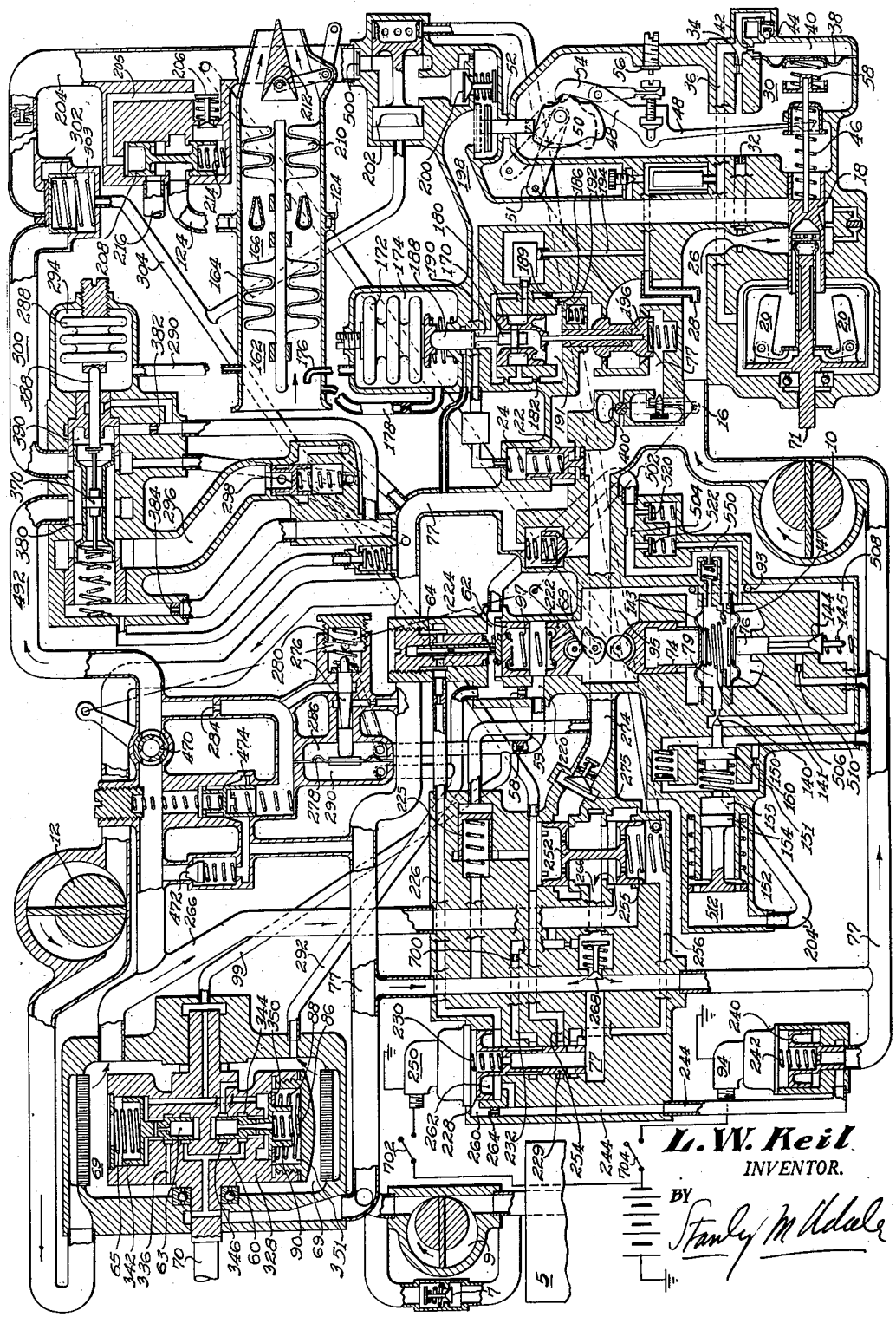

2,596,815

UNITED STATES PATENT OFFICE 2,596,815

GAS TURBINE FUEL CONTROL HAVING BOTH A NORMAL SPEED AND AN EMERGENCY CONTROL

Leonard W. Keil, Wayne, Mich., assignor to George M. Holley and Earl Holley

Application April 29, 1949, Serial No. 90,444

12 Claims. (Cl. 60—39.28)

The objects of this invention are to:

(a) Control the operation of a gas turbine which has two pumps, one a governor controlled unit, in which the governor is manually controlled, for normal operation, and the other a 100% manually controlled pump for emergency use so that if the normal pump fails or its governor control fails the emergency manual control takes over immediately.

(b) During acceleration, and until governing commences, the normal pump should not be interfered with and another object is to prevent the emergency control from being brought into action until acceleration is completed and governing commences.

(c) Another object is to provide a speed limiting device to limit the speed of the gas turbine, that is, the speed possible with the manual control being unlimited some safety device is necessary.

(d) To arrange to automatically dump the fuel in the inlet manifold at the time the turbine stops.

(e) To arrange means whereby both the manual and normal controls of the fuel available for acceleration is decreased as the altitude increases, and increases slightly with speed and decreases slightly with temperature.

(f) Another object is to hold the control in the manual position after once going into manual control, otherwise "hunting" would occur and the same means would enable the control to be put into "manual" control at any time.

(g) After going over to manual, manual reset means must be provided to return the mechanism to automatic.

Summary

The control starts with a speed sensing device which determines whether the speed selected manually for the centrifugal governor control of the normally operating pump is all right. If the manually selected speed is not attained something is wrong with the normal pump, the governor or the fuel passages connected thereto. Immediately a selector valve switches the control over to the emergency pump subjected to the emergency manual control and to an emergency governor controlled by the speed sensing mechanism.

During acceleration obviously the speed is below that selected by the manual control of the centrifugal governor, hence, until acceleration is completed and governing has commenced the automatic switch-over must not be permitted to function prematurely.

The time delay after acceleration has ended and after governing has begun is adjusted by a "leak" orifice.

The manual control replaces centrifugal control and hence might wreck the turbine at maximum demand, an override control to limit speed controlled by the speed sensing device is therefore provided. The pumps are provided with relief valves. Throttle valves are each provided with the usual constant pressure drop valves so that the flow at any throttle position does not depend on the efficiency of the fuel pumps. The centrifugal governor is provided with the usual anti-droop device and overshoot preventative means.

The figure is a diagrammatic illustration of the preferred form of my invention.

In the figure fuel enters the inlet passage 77 from a source maintained at approximately 15 pounds per square inch. A low pressure pump 9 with a pressure relief valve 7 directs fuel from the fuel tank 5 and furnishes fuel to the passages 77. Two pressure pumps are provided which together with pump 9 are driven by the gas turbine 210. These pumps are:

(a) The primary pump 10, and
(b) The emergency pump 12.

These pumps are shown as the constant displacement type. The pressure in the passage 16 is thus maintained at approximately 400 pounds per square inch. This fuel flows past a centrifugal governor valve 18 which is controlled by a centrifugal governor 20 driven from the gas turbine by a shaft 71. Here the pressure drops to approximately 350–360 pounds per square inch. Relief valve 22 and spring 24 maintain this relationship which is a constant pressure drop at valve 18. Venturi 26, Pitot tube 28 maintain a pressure drop in chamber 30. This pressure drop is modified by restrictions 32 and 34. Passage 36 is connected directly to the Pitot tube 28.

A diaphragm 38 forms the left hand moving wall of chamber 40 also connected to the passage 36 through a restriction 42. A spring loaded check valve 44 also connects the chamber 40 to passage 36 but only when the diaphragm 38 is moving to the right, that is, during deceleration.

Valve 18 is loaded by a spring 46 which is engaged on its right by the manually operated lever 48. A manually operated lever 51 and a cam 50 operated by this lever 51 engages with the upper end 54 of lever 48 and the lower end of shut-off valve 52. This upper end 54 is pivotally mounted on the upper end of lever 48 and is adjustable by means of the low speed adjustment 56. A compression spring 58 is interposed between diaphragm 38 and valve 18. All of the governor details are described in a copending application of Andrew William Orr, Jr., Serial No. 31,583 filed June 7, 1948.

An acceleration control valve 196 is responsive to air density and to a certain degree to air temperature in the air entrance to the gas turbine 162 and to the air compressor 164 leading to the combustion chamber 166 into which the fuel inlet manifold 124 discharges. This acceleration device is also described in said copending application, Serial No. 31,583. It consists of a pilot valve 170 moved by a partially evacuated bellows 172 enclosed in a chamber 174 and is provided with a circulation of air from the air entrance 162 through the Pitot tube 176 and restricted passage 178. This servomotor (pilot) valve 170 operates a slave piston 180 in a well known manner.

The response of this slave piston 180 to the servomotor (pilot) valve 170 is modified by the restrictions 182, 189 and 186. A piston 188 is subjected to the pressure in the upper part of chamber 190. The pressure in this chamber 190 modified the action of the partially evacuated bellows 172 as set forth in said copending application, Serial No. 31,583. The pressure in chamber 190 reacts against the small piston 188.

A spring loaded non-return valve 192 limits the pressure rise in the lower part of chamber 191 and thus limits the pressure in the upper part.

High operating pressure for the slave piston 180 is admitted from the Pitot tube 28 through the pipe 194 when the valve 196 opens (as it does more and more as altitude increases and less and less as temperature falls). The amount of fuel available during acceleration becomes less and less as altitude increases. Valve 196 returns fuel to the low pressure pipe system 77.

As fuel flows up passage 198, past shut-off valve 52, past non-return valve 200 where pressure drops 60 pounds per square inch, that is, to a pressure of between 280 and 300 pounds per square inch, the fuel flows past the emergency responsive valve 202, past the check valve 500, to the fuel inlet passage 204, past the spring loaded non-return valve 206, past the dump valve 208 to the fuel inlet manifold 124 from which the fuel discharges into the combustion chamber 166 and in burning provides the motive force for the turbine 210 which is also controlled by the movable tail piece 212.

The dump valve 208 is normally closed but when the turbine stops it rises under the influence of spring 214 and permits fuel remaining in the fuel inlet manifold 124 to escape overboard through the pipe 216. The pressure opposing the spring 214 is provided by the passage 205. Normally the pressure above valve 214 is greater than the pressure below valve 214 because of the pressure drop at valve 206. Hence, normally the dump valve 208 is closed and fuel freely flows past the non-return valve 206 to the inlet manifold 124.

*Emergency system*

The emergency pump 12 replaces the primary pump 10 whenever the speed selected by the lever 51 is not reached by the turbine after acceleration has ceased and when governing by the valve 18 has begun.

A shaft 70, also driven by the gas turbine, drives a disc 328 in which there are two pistons: 90 below and 342 above.

The pressure in chamber 63 is thus held at a value which decreases as the speed increases in order that the piston 342 ceases to move and reaches a neutral position, as shown. A light spring 65 is provided for initial stability.

The lower piston 90 also controls two ports. Ports 344 is connected with the low pressure fuel passage 60. Ports 336 and 346 are connected with the high pressure fuel in chamber 69.

Springs 86 and 88 urge the piston towards the center and centrifugal force urges piston 90 down and piston 42 up.

A washer 350 is seated by the spring 88 and acts as the low speed stop to piston 90. Low speed spring 86 pushes the piston 90 up so that the port 344 admits low speed fuel to the chamber 351 at the lowest possible speeds.

A manually operated cam 68 engages a piston 222, and through piston 222 a piston 62 is also subjected in its lower face to the speed responsive pressure transmitted through passage 99 to chamber 220. When the pressure in the passage 99 plus the pressure exerted by the spring 97 overcomes the higher pressure in chamber 224 the servomotor valve 64 moves up and admits high pressure to the passage 226 to the underside of the piston 228. Piston 228 rises compressing the spring 230 and opening the passage 232 to the underside of piston 228 through a restricted orifice 700. Piston 228 then is held up until the reset mechanism is operated manually by opening the switch 704.

The reset mechanism 94 consists of an electric solenoid which raises piston 240, compressing spring 242 which admits low pressure fuel from passage 77 to passage 244 which allows the spring 230 to reset the piston-valve 228 in the position in which it is shown. If it is desired to raise the piston valve 228 manually, the manually operated electric solenoid inside casing 250 is used to raise the piston-valve 228 independently of speed or fluid pressure responsive thereto. An electrical switch 702 controls the supply of electricity to the solenoid inside the casing 250. An electrical switch 704 controls the supply of electricity to the solenoid inside the casing 94.

Piston valve 228 acts as an intermediate servomotor valve to the selector valve 252 which is the slave of piston valve 228 in the following manner:

A passage 254 terminates in a port on the left controlled by servomotor valve 229, which is an extension of piston valve 228, as shown. Servomotor valve 229 closes the passage 254. Small perforations are provided in the piston which forms the upper end of selector valve 252. Passage 256 also terminates on the left in a port controlled by the end of servomotor valve 229, in the position shown, and passage 256 is open to the low pressure fuel in the pipes 77 through the center of servomotor valve 229. There is a passage through the center of servomotor valve 229 communicating with the chamber 260, above the piston 228. Chamber 260 communicates with the chamber 262 below the servomotor valve 228, through a restriction 264 in the passage 244. The piston forming the lower end of selector valve 252 is also perforated and is provided with a spring 255. Hence, the passage 266, which is the main escape outlet from emergency pump 12, is shown returning to the inlet side 77 of the pipe system through a spring loaded non-return valve 268. This valve establishes 20 pounds per square inch pressure difference between the return passage 266 and the passage 77. This is the operating pressure for the servomotor valve 64. When in response to the rise of the servomotor valve 64 selector valve 252 rises and prevents the emergency fuel escaping down passage 266 and compels the emergency fuel pump to discharge down past the manuel control 470. When this happens the fuel from the primary pump 10 escapes through the passage 274, past the check valve 275, past the valve 252 and past the non-return valve 268.

The control has now passed over to the emergency system which consists of the manual valve 470, the emergency relief valve 472, and the constant pressure valve 474 which establishes an approximate 45 pounds per square inch drop across the manual valve 470. As there is no centrifugal governor 20 to protect the turbine 210, valve 276 is controlled by a diaphragm 278 and loaded by a compression spring 280. The chamber 286, to the right of diaphragm 278, is subject to the speed responsive pressure in passage 99. This chamber 290, to the left of diaphragm 278, is subject to the fuel pump pressure in the passage 292 which is connected with high pressure chamber 69.

When the difference between the pressure in chambers 290 and 286 exceeds the pressure exerted by the compression spring 280 the valve 276 travels to the right lowering the pressure beneath the valve 474 because of the restriction 284. Valve 276 has a long taper and 280 is a long spring so that the turbine is held at a specific speed.

The fuel from the manual control 470 flows past an acceleration device which replaces the acceleration device 172—174—170 etc., of the primary pump system.

The barometric element 288, in the chamber 294, is connected through the air passage 290 with the air entrance 162 of the air compressor 164 of the gas turbine 210.

As before, a plunger 388 engages with a pilot valve 370 which controls a valve 380 which acts as a flow divider. Fuel passage 492 flows down through and around valve 380 to passage 296, through and around constant pressure valve 298 and into the low pressure pipe system 77. Another portion of the fuel stream continues on its way up through and around valve 380 to passage 300, past the shut-off valve 302, corresponding to valve 202. This valve 302 is loaded below with a compression spring 303 and also by the pressure from the primary pump 10, through the passage 304 so that when primary pump 10 is in action valve 302 is held firmly closed by the action of spring 303.

Fuel then flows through passage 204 and then through the non-return valve 206, past the dump valve 208 to the inlet manifold 124. A check valve 500 prevents fuel from passage 204 from flowing past the valve 202.

The control of the acceleration valve 380 is modified, as before, by the restriction 384 and 382 corresponding to the restriction 184 and 182. As before the pressure in chamber 390, acting on the plunger 388 slightly modifies the action of the evacuating or partially evacuated bellows 288.

Beneath the cam 68 is a piston 74 which engages with a diaphragm 143. Diaphragm 143 is the upper wall of a chamber 79. On the lower wall of this chamber is another diaphragm 141. The chamber 79 is connected with the pressure from the emergency pump system, that is with the pressure from the emergency pump 12, through a passage 502, through a resriction 504, through the spring loaded check 550 into the chamber 79. A compression spring 145 engages with a valve 144, which valve engages with the diaphragm 141. A spring 140 keeps the diaphragm 143 in contact with the piston 74. A chamber 508 is connected to the chamber 95 which in its turn is connected to the chamber 99. The chamber 508, into which the valve 144 opens, is also connected to the chamber 95 and thus to the passage 99. When the valve 144 is open low pressure fuel from the passage 77 is admitted to chamber 508, that is to the chamber 95 through the restriction 510.

A time relay device is provided for a falling manifold pressure comprising a passage 204' connected to a chamber 512, to the left of the piston 154 which piston is pushed to the left by a spring 152. When the pressure in the passage 204 falls piston 154 travels to the left, pressure in chamber 155 falls and the normally closed valve 150 is opened by the travel to the left of the piston 151. This lowers the pressure in the chamber 79 so that the spring 145 closes the valve 144.

After the acceleration ends and governing begins valve 150 opens immediately and the valve 144 closes so that the pressure in chambers 508 and 95 can build up and the normal functioning of the servomotor valve 64 can be resumed. By this means during acceleration the operation of the valve 68 will not interfere with the normal functioning of the device.

When the selector valve 252 descends into the position in which it is shown, pressure builds up in passage 274. This pressure is applied to valve 225 which enables the pressure generated by the pump 12 to be applied to the upper side of valve 252 through the upper perforations in the valve 252. When the reverse happens and the valve 252 rises valve 225 moves to the right and connects the upper surfaces of valve 252 to the low pressure existing in the low pressure circuit 77.

When the shut off valve 52 is completely closed then the valve 400 opens in order to relieve all the internal pressure in passages 16, for example during the subsequent slowing down of the gas turbine.

A check valve 522 is provided to establish a small pressure difference (for example 3 to 4 pounds per square inch) between chamber 79 and chamber 506 (the pressure in chamber 79 being higher) up to the moment when cam 68 causes valve 144 to open.

A check valve 520 is provided to limit the decrease in pressure which occurs in chamber 508 when the valve 144 opens and low pressure is admitted from the low pressure pipe system 77 through restriction 510.

*Operation*

Assume that the cam 68 is rotated manually anti-clockwise rapidly and that the turbine accelerates. During acceleration the pressure in the fuel inlet manifold 124 and the pressure in passage 204 increases and the piston 154 travels to the right and compresses the spring 152. During this time the valve 150 is closed and the fuel in the chamber 79, between the two diaphragms 141 and 143, is for all practical purposes trapped as the vent 147 is extremely small having an area of .0001 square inch. Hence, the diaphragms 141 and 143 both descend and the spring 145 is compressed and the valve 144 is opened as the shaft 76 descends. Low pressure fuel from the passage 77 thus enters the chamber 508, passage 93 and chamber 95. Servomotor valve 64 is thus inoperative and remains inoperative until acceleration ends and governing begins. When governing begins the valve 150 immediately opens because the pressure in the inlet manifold 124 falls. The valve 150 is drawn to the left by the piston 151 for a short period of time determined by the orifice 160 which permits the low pressure fuel in passage 77 to enter chamber 155. The pressure trapped between the two diaphragms 141 and 143 escapes. The spring 145 causes the valve 144 to close. The speed responsive pressure in passages 93, 95, and 99 is re-established and the servomotor valve 64 once more becomes operative.

After acceleration is over and when the throttle 18, controlled by the governor 20, begins to throttle the fuel, the pressure in the inlet passage 204 falls and piston 154 moves to the left, piston 151 also moves to the left in response to the semi-vacuum that would otherwise be created and thus the valve 150 is opened so that valve 144 is closed and the normal control of the selector valve is resumed.

In the event of the failure of the centrifugal governor 20 in its closed position or of the primary pump 10 so that necessary fuel is not provided during acceleration the pressure in the pipe 204 and chamber 512 falls, piston 154 moves to the left and sucks piston 151 to the left which opens the bleed valve 150 and closes valve 144 and thus re-establishes speed sensitive pressure in chamber 95. This action throws servomotor valve 64 up and move valve 228 up which moves selector valve 252 up. This puts the device in the position for manual operation.

When this happens servomotor valve 64 ascends and pressure is applied below the valve 228 and the moment valve 228 rises hydraulic pressure through restriction 700 enters the chamber 262 and positively holds the piston 228 up even if the valve 64 descends so that no "hunting" can take place.

In the operation of the valve 144 the effective size of valve 144 has to be reduced and for this reason a restriction is provided, the area of 510 being comparable to the area of the seat of the valve 150.

With piston 228 in its "up" position the passage 254, above selector valve 252, is put into communication with low pressure passage 77 so that valve 252 rises under the influence of spring 255. At the same time passage 256 is put out of communication with the low pressure circuit 77. High pressure immediately builds up in passage 256 through the lower perforations in the valve 252. The rise of valve 252 blocks the escape of the fuel from pump 12, down pipe 266. Hence, fuel flows above 492, past flow divider 380, along pipe 300, past valve 302 which opens when pressure in pipe 304 falls. The pressure in pipe 304 falls because pipe 304 is connected to passage 254 which is now connected to the low pressure circuit 77.

*To reset the device.*—The switch 704 is closed and valve 240 rises. Low pressure is then applied through passage 244 to below piston 228. Spring 230 then pushes piston 228 down back into the position in which it is shown. The pressure above and below the selector valve 252 is now reversed and the valve 252 returns to the position in which it is shown.

*Override manual control.*—If it is desired to place the device in its manual position for any reason the switch 702 is closed, the piston 228 is raised by the electric magnet inside casing 250 and the hydraulic pressure above and below selector valve 252 is once more reversed and again the pump 10 is rendered inactive and the pump 12 is put into action.

*Governor 70.*—In the upper left hand corner a centrifugal governor driven by shaft 70 is shown which has this effect on the system when in its emergency condition: Assume that the manual control valve 470 is in active control of the gas turbine because the speed selected by cam 68 was not reached in a reasonably short period of time as already related. Then assume that an excessive speed is attained, at any rate a speed close to the limiting (dangerous) speed. In that event the pressure difference on diaphragm 278 becomes greater than the pressure exerted by the spring 280. The tapered valve 276 moves to the right. The pressure below the valve 474 falls and the fuel flow from the manual valve 470, along passages 492—300 into passage 204 drops. Hence, this centrifugal governor not only acts during the automatic operation as a speed sensing device to see to it that the speed selected by the variable speed governor 20 is attained but after the primary pump 10 has failed the governor 70—60—62, etc., remains acting as a speed limiting device.

In the event that the governor 20 "sticks," that is, fails in its closed position the failure of the pump 10, the effect of which has just been described, would be duplicated.

In the event that the governor 20 failed in its wide open position then the governor driven by shaft 70 would immediately take over the control as follows: Centrifugal force of weight 90 would overcome spring 88 at a speed slightly above normal maximum. This would open up port 346 and admit high pressure from chamber 69, through pipe 99 and to chamber 220. Spring 97 thereupon pushes up piston 62 and servovalve 64. This valve 64 admits high pressure from chamber 224 to the passage 226 and thus to chamber 262. Piston 228 rises and causes piston 252 to rise.

What I claim is:

1. In a manually controlled normally operating governor control for a gas turbine combined with an emergency control system, the combination including first and second turbine driven fuel pumps, a normal operating governor controlled fuel supply valve for the first pump and an emergency manually controlled fuel supply valve for the second pump, an automatically operated selector valve to substitute the manually controlled emergency fuel supply for the governor controlled normal fuel supply whenever the governor controlled valve fails to furnish sufficient fuel to permit the turbine to attain the speed for which the governor is manually set, means to prevent the premature shift from automatic to manual comprising a manually operated cam interconnected with the manual control of said governor, a spring controlled by said cam, a speed sensitive hydraulic device driven by said turbine which controls a variable hydraulic pressure indicative of speed, a moving wall the movement of which is responsive to said variable hydraulic pressure and to the variable spring pressure acting in opposition to each other, a servomotor valve connected to said moving wall and controlling said selector valve whenever the variable hydraulic pressure corresponds to a speed below the selected speed, a chamber connected to the normal fuel supply downstream of the manually controlled governor valve, a moving wall in said chamber subject to the pressure therein, a chamber on the opposite side of said moving wall connected to the low pressure side of said fuel supply system, a first bleed valve adapted to be opened by the movement of said moving wall in response to a sudden drop in pressure in said chamber due to the action of said governor valve, said first bleed valve acting as a bleed to a chamber having a moving wall and connected to the high pressure side of said fuel system, the other side of said moving wall being responsive to the speed sensitive pressure, a second bleed valve also communicating with the low pressure fuel system and connected to the last mentioned moving wall, a third moving wall also connected to said cam, yieldable means opposing its movement, said third moving wall forming another wall of said last mentioned chamber so that the pressure therein rises whenever any increase in speed is called for by the movement of the cam and the movement of the manual control of said governor, the second bleed valve being adapted to open as a result of this movement of said third moving wall, whereby said second bleed valve lowers the speed sensitive pressure during acceleration to prevent the premature operation of the selector valve, the first bleed valve causing the second bleed valve to close at the end of acceleration so that the normal control of the selector valve is resumed.

2. In a manually controlled normally operating governor control for a gas turbine combined with an emergency control system, the combination including a normally operating governor controlled fuel supply valve and an emergency manually controlled fuel supply valve, an automatically operated selector valve and control means therefor to substitute the manually controlled fuel supply for the governor controlled fuel supply whenever the governor controlled valve fails to furnish sufficient fuel to permit the turbine to attain the speed for which the governor is manually set, said selector valve and control means therefor comprising a spring loaded servomotor valve, a third manually controlled means for varying the spring load on said valve, a speed sensitive hydraulic device driven by said turbine which controls a variable hydraulic pressure indicative of speed, means whereby the spring load on said servomotor valve is balanced against said variable hydraulic pressure, a spring loaded slave valve, passages connecting said slave valve to said servomotor valve, passages connecting said slave valve to said selector valve whereby said slave valve acts as a servomotor valve to said selector valve, hydraulic means for holding said slave valve in the position into which it is moved when it moves the selector valve into the position in which the governor controlled valve is rendered inoperative and in which the manually controlled valve becomes operative, means for operating said third manual control means simultaneously with the first manual control which controls the normally operating governor and with the second manual control which controls the emergency fuel supply.

3. A device as set forth in claim 2 in which there is an electric magnetic control means for moving said slave valve independently of said servomotor valve including an electric circuit and a manually operated switch therefor.

4. A device as set forth in claim 2 in which there are means to reset the device from the manual position to governor controlled position comprising an electromagnet, an electric circuit therefor, a manually operated switch therefor, a valve operated by said electro-magnetic means, a passage in the low pressure fuel circuit controlled by said valve and leading to said slave valve to neutralize the effect of said servomotor valve so that the slave valve moves back into its original position under the influence of the spring which imposes a load on it.

5. A gas turbine fuel control device which includes a source of fuel under a relatively low pressure, two turbine driven fuel pumps, one for normal operation the other for use in an emergency, a double acting selector valve for switching from normal to emergency operation comprising two cylindrical piston valves having crowns which are connected together by a piston rod, two end cylinders in which the two pistons slide, an intermediate cylindrical chamber between the two pistons located around said rod, an escape outlet from said chamber, two escape passages leading one from each of said pumps and surrounding each of said piston valve so that when one passage is blocked by one of the piston valves the other passage is open, the pressure in the cylinder of the piston valve blocking the emergency pump outlet being normally connected to the low pressure side of the fuel system so that the pressure of the fuel escaping from the emergency fuel pump acts to hold the selector valve in this its normal position, means responsive to the failure of the normal fuel supply means to reverse the fuel pressures acting on said pistons of said selector valve so that the selector valve moves into its emergency position and the outlet from the emergency fuel pump is now blocked and the outlet from the normal fuel pump is now open to the escape outlet from said cylindrical chamber.

6. A device as set forth in claim 5 in which the means for reversing the pressure acting on the ends of said pistons of said selector valve comprise a restricted passage between each end cylinder and the intermediate cylinder, speed responsive means for moving said valve when the speed falls below a preselected value, a spring loaded slave valve, a passage controlled by said servomotor valve to apply fuel under pressure to said slave valve to move it against the action of the said spring when the speed falls below said preselected value, two passages each one connected so as to release the pressure from each end cylinder of said selector valve, said pressure being derived from the restricted passages from said end cylinders, valve means connected to said slave valve to release the pressure in one of said passages when the slave valve is in one position and to release the pressure in the other passage when the slave valve has been moved into its other position so as to reverse the pressure acting on the two ends of said selector valve.

7. A device as set forth in claim 5 in which the means for reversing the pressures acting on the ends of said pistons of said selector valve comprise a restricted passage between each end cylinder and the intermediate cylinder, a servomotor valve, speed responsive means for moving said valve when the speed falls below a preselected value, a spring loaded slave valve held in its normal position by said spring, a passage controlled by said servomotor valve adapted to supply pressure to move said slave valve against the action of said spring when the speed falls below said preselected value, another passage normally blocked by said slave valve and connected to fuel under pressure and adapted when said slave valve is moved by said servomotor valve to apply said pressure to said slave valve to prevent the spring restoring the slave valve to its original position should the servomotor valve move back into its original position, two passages each one connected so as to release the pressure from each end of said selector valve, said pressure being derived from the restricted passages from said end cylinders, valve means connected to said slave valve to release the pressure in one of said passages when the slave valve is in one position and to release the pressure in the other passage when the slave valve has been moved into its other position so as to reverse the pressures acting on the two ends of said selector valve.

8. A device as set forth in claim 5 in which the means for reversing the pressures acting on the ends of said pistons of said selector valve comprise a restricted passage between each end cylinder and the intermediate cylinder, a servomotor valve, speed responsive means for moving said valve when the speed falls below a preselected value, a spring loaded slave valve held in its normal position by said spring, a passage controlled by said servomotor valve adapted to supply pressure to move said slave valve against the action of said spring when the speed falls below said preselected value, another passage normally blocked by said slave valve and connected to fuel under pressure and adapted when said slave valve is moved by said servomotor valve to apply said pressure to said slave valve to prevent the spring restoring the slave valve to its original position should the servomotor valve move back into its original position, two passages each one connected so as to release the pressure from each end of said selector valve, said pressure being derived from the restricted passages from said end cylinders, valve means connected to said slave valve to release the pressure in one of said passages when the slave valve is in one position and to release the pressure in the other passage when the slave valve has been moved into its other position so as to reverse the pressures acting on the two ends of said selector valve, and manual means for moving said slave valve into its emergency position and positively holding it in that position.

9. A device as set forth in claim 5 in which the means for reversing the pressures acting on the ends of said pistons of said selector valve comprise a restricted passage between each end cylinder and the intermediate cylinder, a servomotor valve, speed responsive means for moving said valve when the speed falls below a preselected value, a spring loaded slave valve held in its normal position by said spring, a passage controlled by said servomotor valve adapted to supply pressure to move said slave valve against the action of said spring when the speed falls below said preselected value, another passage normally blocked by said slave valve and connected to fuel under pressure and adapted when said slave valve is moved by said servomotor valve to apply said pressure to said slave valve to prevent the spring restoring the slave valve to its original position should the servomotor valve move back into its original position, two passages each one connected so as to release the pressure from each end of said selector valve, said pressure being derived from the restricted passages from said end cylinders, valve means connected to said slave valve to release the pressure in one of said passages when the slave valve is in one position and to release the pressure in the other passage when the slave valve has been moved into its other position so as to reverse the pressures acting on the two ends of said selector valve, and manual means for resetting the slave valve in its normal position after it has been moved into its emergency position.

10. A device as set forth in claim 5 in which the means for reversing the pressures acting on the ends of said pistons of said selector valve comprise a restricted passage between each end cylinder and the intermediate cylinder, a servomotor valve, speed responsive means for moving said valve when the speed falls below a preselected value, a spring loaded slave valve held in its normal position by said spring, a passage controlled by said servomotor valve adapted to supply pressure to move said slave valve against the action of said spring when the speed falls below said preselected value, another passage normally blocked by said slave valve and connected to fuel under pressure and adapted when said slave valve is moved by said servomotor valve to apply said pressure to said slave valve to prevent the spring restoring the slave valve to its original position should the servomotor valve move back into its original position, two passages each one connected so as to release the pressure from each end of said selector valve, said pressure being derived from the restricted passages from said end cylinders, valve means connected to said slave valve to release the pressure in one of said passages when the slave valve is in one position and to release the pressure in the other passage when the slave valve has been moved into its other position so as to reverse the pressures acting on the two ends of said selector valve, manual means for moving said slave valve into its emergency position and positively holding it in the position, and manual means for resetting the slave valve in its normal position after it has been moved into its emergency position.

11. A device as set forth in claim 5 in which the means for reversing the pressure acting on the ends of said pistons of said selector valve comprise a restricted passage between each end cylinder and the intermediate cylinder, speed responsive means for moving said valve when the speed falls below a preselected value, a spring loaded slave valve, a passage controlled by said servomotor valve to apply fuel under pressure to said slave valve to move it against the action of the said spring when the speed falls below said preselected value, two passages each one connected so as to release the pressure from each end cylinder of said selector valve, said pressure being derived from the restricted passage from said end cylinders, valve means connected to said slave valve to release the pressure in one of said passages when the slave valve is in one position and to release the pressure in the other passage when the slave valve has been moved into its other position so as to reverse the pressure acting on the two ends of said selector valve, and manual means for moving said slave valve into its emergency position and positively holding it in that position.

12. A device as set forth in claim 1 in which there is a spring engaging with the moving wall located in the chamber connected to the fuel pressure downstream of the governor valve, so that the chamber expands during the acceleration period which follows the movement of the manually operated governor control in the direction calling for an increase in speed and which chamber decreases in volume when the acceleration period is completed and the governor valve acts to cause the pressure in said chamber to fall.

LEONARD W. KEIL.

No references cited.